(12) United States Patent
Li et al.

(10) Patent No.: US 7,960,673 B2
(45) Date of Patent: *Jun. 14, 2011

(54) PORTABLE ELECTRIC GRILL

(76) Inventors: George T. C. Li, Carson City, NV (US); William Terry Robertson, Jr., Auburn, AL (US)

(*) Notice: Subject to any disclaimer, the term of this patent is extended or adjusted under 35 U.S.C. 154(b) by 869 days.
This patent is subject to a terminal disclaimer.

(21) Appl. No.: 11/986,734

(22) Filed: Nov. 26, 2007

(65) Prior Publication Data

US 2008/0142503 A1 Jun. 19, 2008

Related U.S. Application Data

(63) Continuation-in-part of application No. 11/047,248, filed on Jan. 29, 2005, now Pat. No. 7,301,128.

(51) Int. Cl.
*H05B 3/68* (2006.01)
*H05B 3/06* (2006.01)

(52) U.S. Cl. .................. 219/450.1; 219/465.1; 219/524

(58) Field of Classification Search .... 219/451.1–468.2, 219/524, 525; 99/372–379, 389–402, 422–425; 126/299 D, 21 R, 21 A
See application file for complete search history.

(56) References Cited

U.S. PATENT DOCUMENTS

| | | | | |
|---|---|---|---|---|
| 2,105,814 A | * | 1/1938 | Lent | 219/452.13 |
| 3,172,999 A | * | 3/1965 | Sutton et al. | 219/524 |
| 3,281,577 A | * | 10/1966 | Altemiller | 219/524 |
| 3,712,819 A | | 1/1973 | Field | 99/400 |
| 3,971,877 A | * | 7/1976 | Lee | 174/16.1 |
| 4,034,663 A | | 7/1977 | Jenn et al. | 99/446 |
| 4,226,177 A | | 10/1980 | Schmidt | 99/372 |
| 4,468,548 A | * | 8/1984 | Yamaki | 219/601 |
| 4,475,528 A | | 10/1984 | Kuchenbrod | 126/9 R |
| 5,446,268 A | * | 8/1995 | Chen | 219/623 |
| 6,526,873 B2 | * | 3/2003 | Brady | 99/332 |
| 7,301,128 B2 | * | 11/2007 | Li et al. | 219/450.1 |

* cited by examiner

*Primary Examiner* — Sang Y Paik
(74) *Attorney, Agent, or Firm* — Clifford F. Rey

(57) ABSTRACT

A portable electric grill including an exhaust fan for indoor grilling is disclosed. The present grill is constructed to permit its supporting frame to be folded from an open position wherein the horizontally disposed grilling plates are supported by folding leg members to a closed position wherein the grilling plates are folded vertically along with the leg members for convenient portability and storage. The present grill provides heating elements associated with each grilling plate, which permits the grilling plates to be selectively energized. An air filter is disposed within the air intake of the exhaust fan utilizing filter media capable of capturing particulate matter of a size range found in cooking fumes generated by the grill. In an alternative embodiment the present grill is designed to permit operation in an either an unfolded or a folded position and also includes a detachable exhaust fan module for the user's convenience.

12 Claims, 19 Drawing Sheets

ND GRILL

PORTABLE ELECTRIC GRILL

CROSS-REFERENCE TO RELATED APPLICATION

This application is a continuation-in-part of U.S. patent application Ser. No. 11/047,248 filed Jan. 29, 2005 now U.S. Pat. No. 7,301,128 entitled Portable Electric Grill and claims the benefit thereof under 35 U.S.C. 120.

BACKGROUND OF INVENTION

The present invention relates to cooking appliances and, more particularly, to a portable electric grill, which is ventilated for indoor cooking and is also foldable for convenient transport and storage.

There are several U.S. patents that are available in the field of portable cooking grills, however, none of them address the long felt need in the manner of the present invention. For example, U.S. Pat. No. 4,034,663 to Jenn et al. discloses one such ventilated portable electric grill. This grill assembly includes a heating element and is topped by a grill element. An upwardly extending portion of the grill housing encloses a power driven fan, which draws air, smoke, and cooking vapors from across the grill element. The fan outlet discharges to the exterior of the housing. The present invention is patentably distinct from this prior art cooking grill because it is foldable for convenient storage and provides other novel structural features to support this functionality.

Another example of a ventilated electric grill is described in U.S. Pat. No. 3,712,819 to Field, which discloses a ventilated open-air indoor broiler having damper means. This grill provides electric heating elements and a positionable damper located at the entrance to an air plenum chamber adjacent the broiler. Air is drawn across the surface of the broiler grill and past the damper means to the plenum and exhausted via an electric fan to the atmosphere by ducting. The present invention is also patentably distinct from this prior art cooking grill due to its foldable construction and other novel structural features not shown in the prior art.

U.S. Pat. No. 4,226,177 discloses a portable grilling device of the foldable type including a first bowl and a second bowl hingedly connected together. The bowls are movable between a closure position where the bowls overlie one another, a generally right angular use position where the second bowl is disposed substantially normal to the first bowl, and a generally horizontal use position where the first bowl and the second bowl are fully opened. This grilling device does not provide electric heating elements or an exhaust fan as featured in the present invention.

Another example of a folding grill apparatus is described in U.S. Pat. No. 4,475,528 which discloses a portable cooking apparatus constructed so that the disassembled parts may be fitted together for easy and convenient storage and transport. This portable cooking apparatus also does not provide electric heating elements or an exhaust fan in the manner of the present invention.

While these devices fulfill their respective, particular objectives and requirements, the aforementioned patents do not disclose the present inventive device. The present invention provides a foldable electric grill having novel structural features including an exhaust fan for indoor grilling and a grease collection tray.

SUMMARY OF THE INVENTION

Accordingly, the present invention is a portable electric grill constructed to permit its supporting frame to be folded from an open position wherein a pair of horizontally disposed grilling plates are supported by folding leg members to a closed condition in which the grilling plates pivot upwardly to a generally vertical position and the leg members fold up for convenient storage. The grill provides a pair of heating elements with individual thermostatic controls, which allow the grilling plates to be selectively energized. The present grill also includes an exhaust fan having an air filter for indoor cooking. The air filter is disposed within the air intake of the exhaust fan and utilizes filter media capable of capturing particulate matter of a size range typically encountered in smoke and cooking fumes generated by such a grill during use.

In another embodiment the portable electric grill is designed to permit operation in both an unfolded (i.e. open position) and a folded (i.e. closed position) of the grill, which enables cooking of food items such as hamburgers and grilled cheese sandwiches on both sides thereof simultaneously. In this embodiment the present grill is provided in two alternative configurations, namely, a first version having an integrated exhaust fan assembly and a second version having a detachable exhaust fan module for the convenience of the user. In such alternative configurations the thermostatic temperature controls may be omitted in favor of a temperature limiting device such as a fuse, which is utilized in conjunction with resistance heating elements to limit temperature to a predetermined level.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Those skilled in the art will appreciate that the conception upon which this disclosure is based may readily be utilized as a basis for the designing of other structures, methods, and systems for carrying out the purposes of the present invention. It is important, therefore, that the claims be regarded as including such equivalent constructions insofar as they do not depart from the spirit and scope of the present invention.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
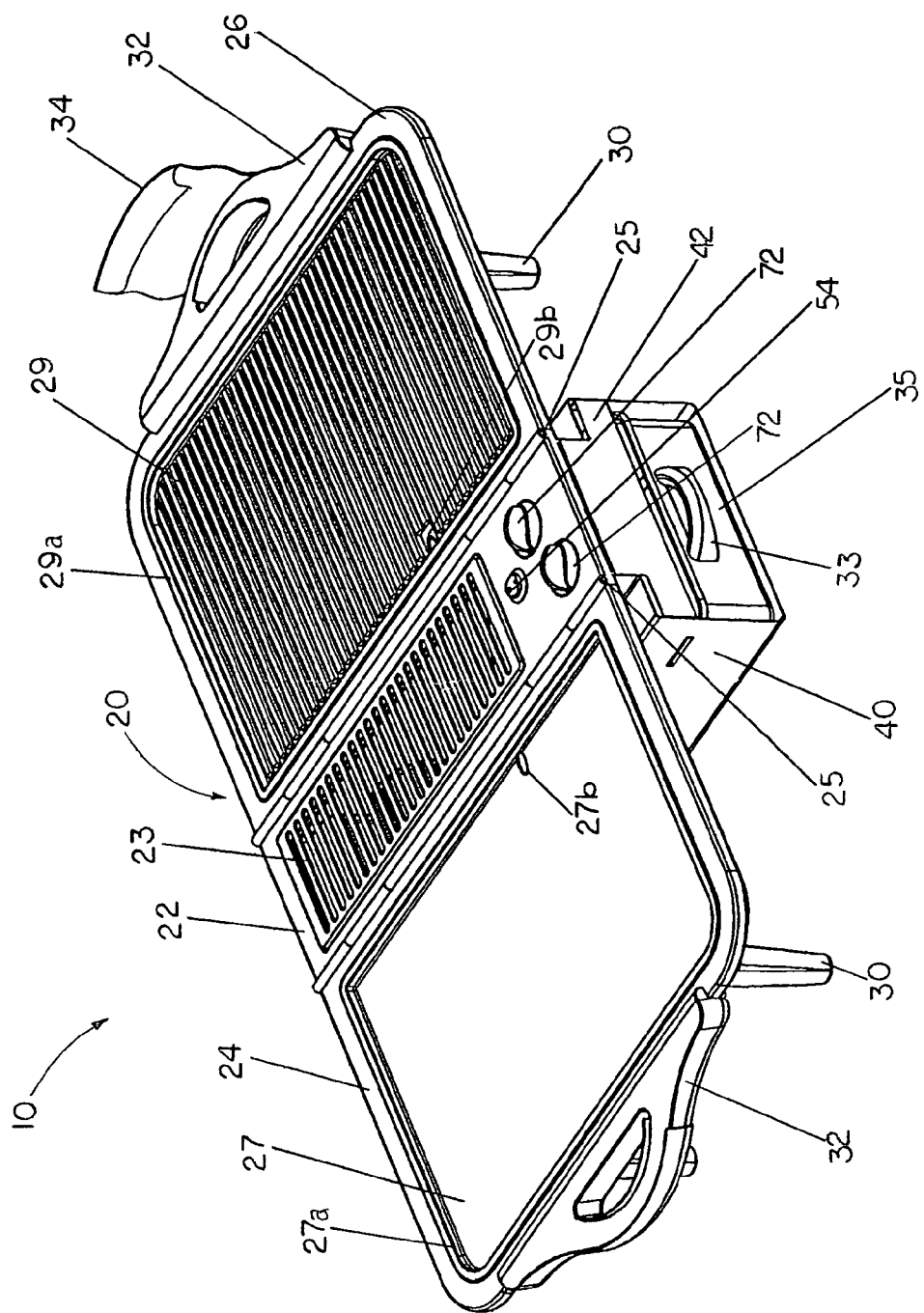
FIG. 1 is a perspective view of the present foldable grill in an unfolded position.

With further reference to the drawings there is shown therein a portable electric grill in accordance with the present invention, illustrated in FIG. 1 and indicated generally at 10. It will be understood that in FIG. 1 the present grill 10 is shown in an unfolded or open position ready for use.

Figure 5:
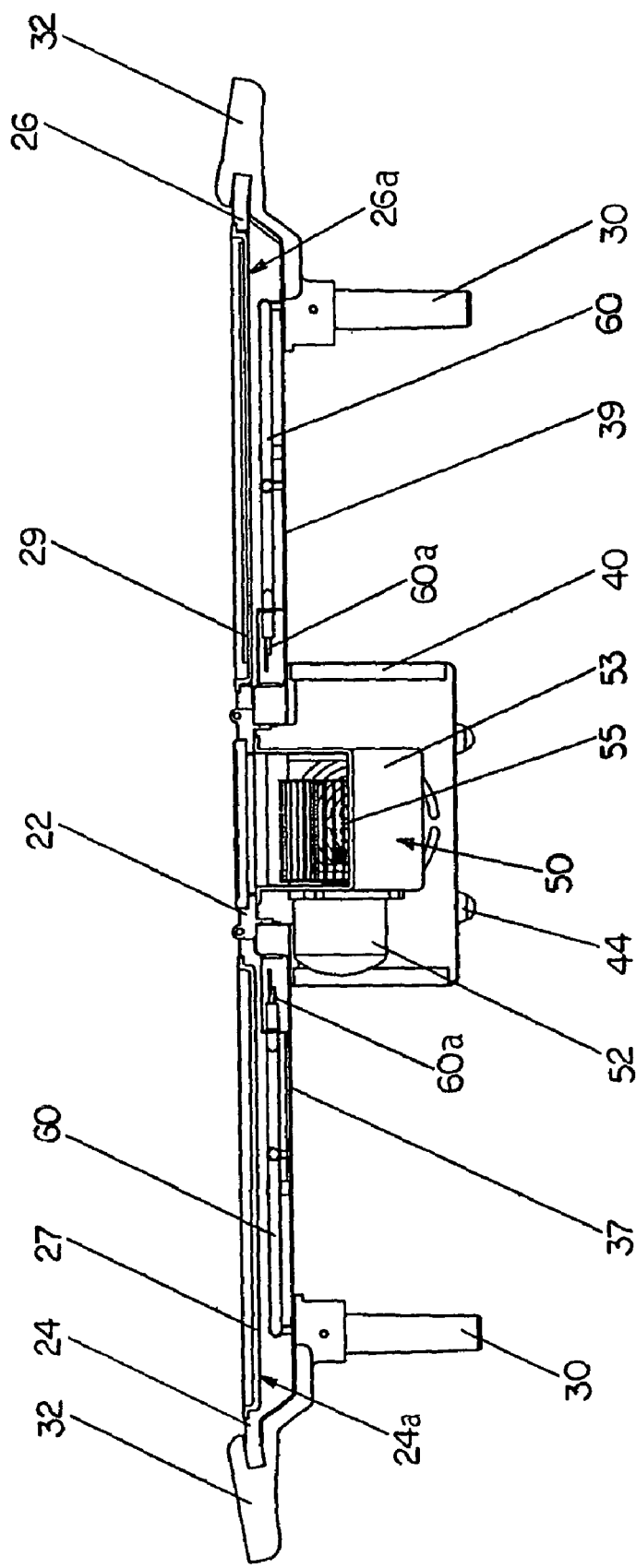
FIG. 5 is a cross-section of the present grill in an unfolded position.

Grill 10 includes a support frame assembly, indicated generally at 20, comprised of a central frame member 22, which is symmetrically disposed between a first frame member 24 and a second frame member 26. In the embodiment shown in FIG. 1, first frame member 24 is D-shaped in configuration defining a receptacle 24a (FIG. 5) wherein a mating D-shaped griddle plate 27 is received and supported. Similarly, second frame member 26 is D-shaped in configuration defining a receptacle 26a (FIG. 5) wherein a mating grill plate 29 is received and supported. Griddle plate 27 and grill plate 29 and their associated frame members 24, 26 respectively are fabricated as unitary constructions (FIG. 1) or, alternatively, griddle plate 27 and grill plate 29 are constructed to be removable from frame members 24, 26 for cleaning purposes (FIG. 5).

Griddle plate 27 and grill plate 29 include raised peripheral edges 27a, 29a respectively which function to retain grease drippings from meats and other foodstuffs prepared thereon. Such grease drippings are delivered via integral drain tubes 27b, 29b formed in plates 27, 29 (FIG. 4) respectively to a drip tray 35 having a handle 33. Drip tray 35 is disposed in sliding relation to housing 40, which is attached to the underside of the frame member 22. This arrangement permits the grill 10 to be folded to its closed or vertical position (FIG. 2) without concern for spillage of grease drippings.

Frame members 22, 24, 26 are fabricated from sheet steel, aluminum, cast iron, or other suitable material and are provided in different exterior finishes such as powder coating, stainless steel, or plated steel.

Figure 2:
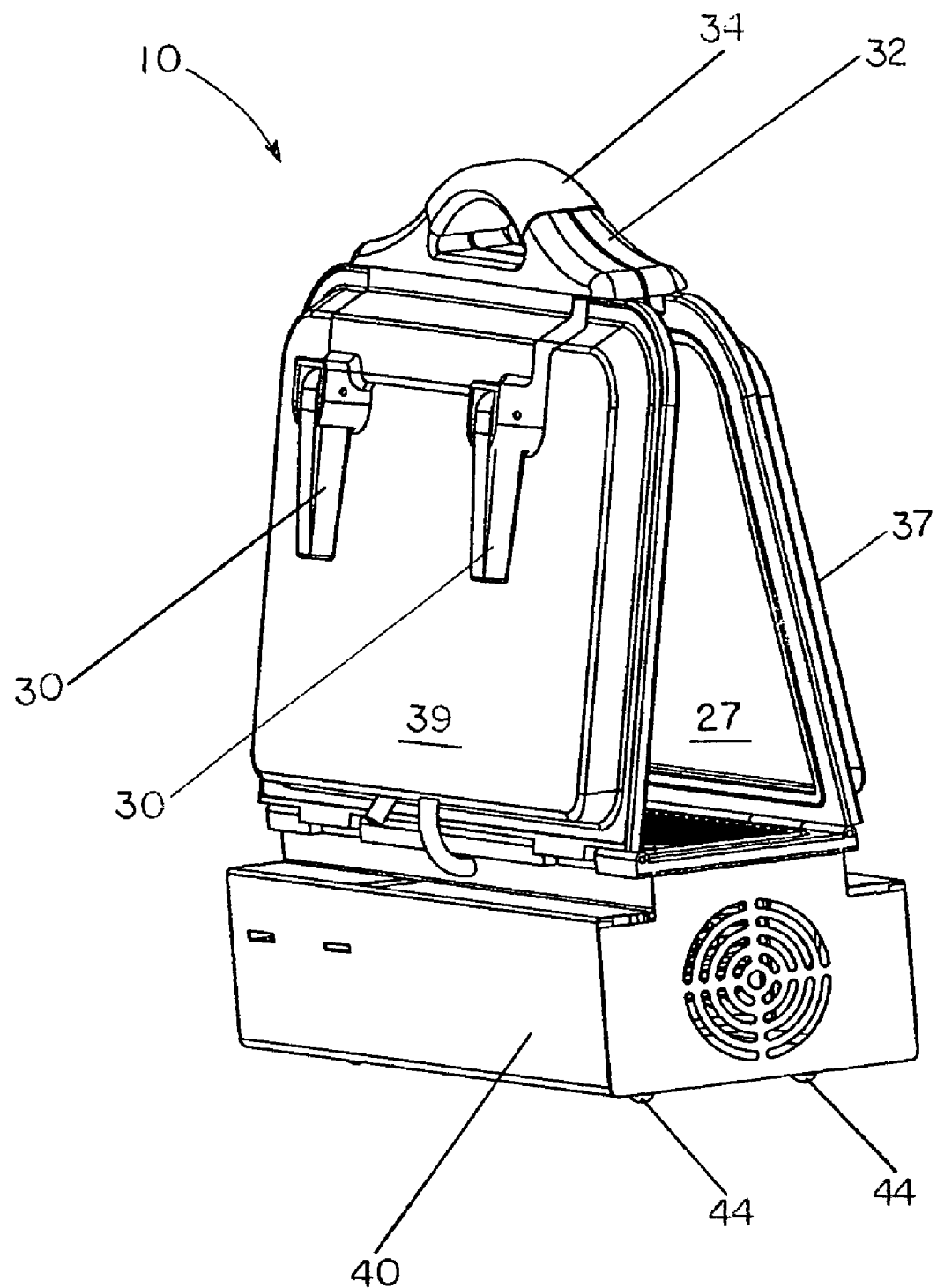
FIG. 2 is a perspective view of the present foldable grill in a folded position.

The support frame assembly 20 provides structures which comprise articulating means including, but not limited to, the following structures. In the embodiment shown in FIG. 1, frame members 24 and 26 are pivotally attached to frame member 22 by hinge pins 25. In this configuration the frame assembly 20 with the symmetrically disposed plates 27, 29 installed is foldable about the hinge pins 25 to a closed or folded condition as shown in FIG. 2. More particularly, it can be seen that frame members 24, 26 can be pivoted upwardly about hinge pins 25 to the generally vertical orientation shown Handles 32 are mechanically attached to frame members 24, 26 and interlock in the folded condition of the grill 10 being secured by a resilient handle lock 34, which snaps into position about the interlocked handles 32 (FIG. 2).

As shown in FIG. 1 frame assembly 20 is supported in its open condition by folding leg members 30, which are pivoted and folded inwardly about the pins 31 against the bottom covers 37, 39 of the grill 10 for convenient transport and storage in its folded condition (FIG. 2). Leg members 30 are fabricated from steel, cast iron, aluminum, heat-resistant composites, or other suitable materials.

Figure 3:
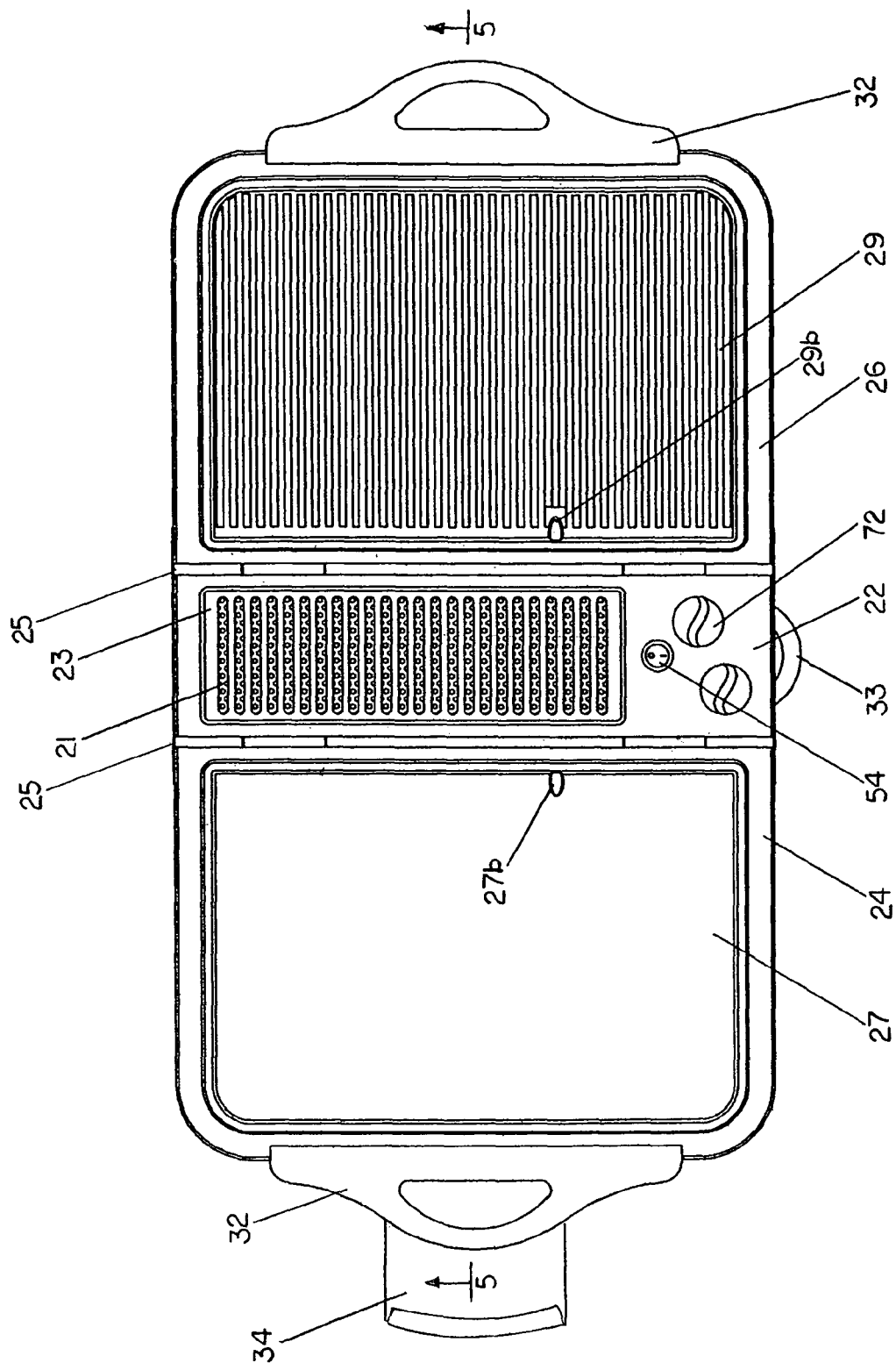
FIG. 3 is a top plan view of the present grill in an unfolded position.

Advantageously, frame member 22 includes a removable vent plate 23 wherein an air filter 21 is disposed (FIG. 3). The media utilized in the air filter 21 is the physical mechanism for controlling smoke and cooking fumes to permit indoor use of the grill 10. The media in the air filter 21 ranges from metallic fibers, synthetic fibers, cellulose fibers, and/or multilayer media designed to capture particulate matter of a size range typically encountered in smoke and cooking fumes generated by the present grill 10.

Figure 4:
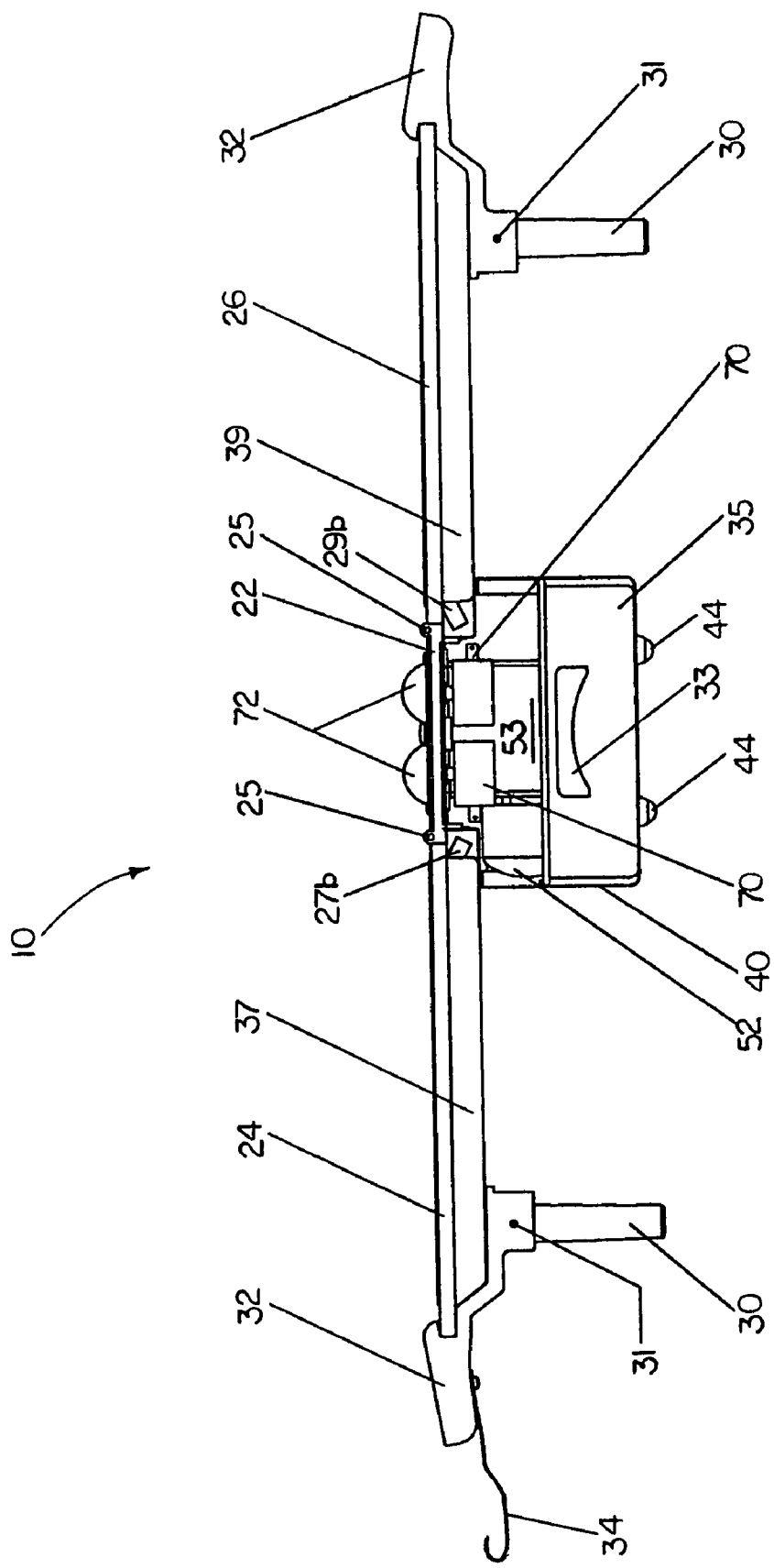
FIG. 4 is a front elevation of the present grill in an unfolded position.

Referring to FIG. 4 there is shown a front elevation of grill 10 in an unfolded position with the front panel 42 (FIG. 1) of the housing 40 removed to show the interior thereof. Housing 40 is provided with a plurality of feet 44 (FIG. 2), which support grill 10 on a countertop or other suitable surface.

Housing 40 encloses an exhaust fan assembly, indicated generally at 50, including a circular fan 55 enclosed within a fan hood 53 (FIG. 5). An intake end 53a of fan hood 53 is positioned adjacent vent plate 23 such that fan 55 draws smoke and cooking fumes generated during use across the plates 27, 29 and through the filter element 21 into the fan 55. Fan 55 propels this flow of filtered air through the exhaust vent 49 (FIG. 7) at the rear of the housing 40 and into the atmosphere. Fan 55 is coupled to a fan motor 52, which is electrically connected to a standard 110 volt power source 79 (FIG. 8) via On/Off switch 54.

Figure 6:
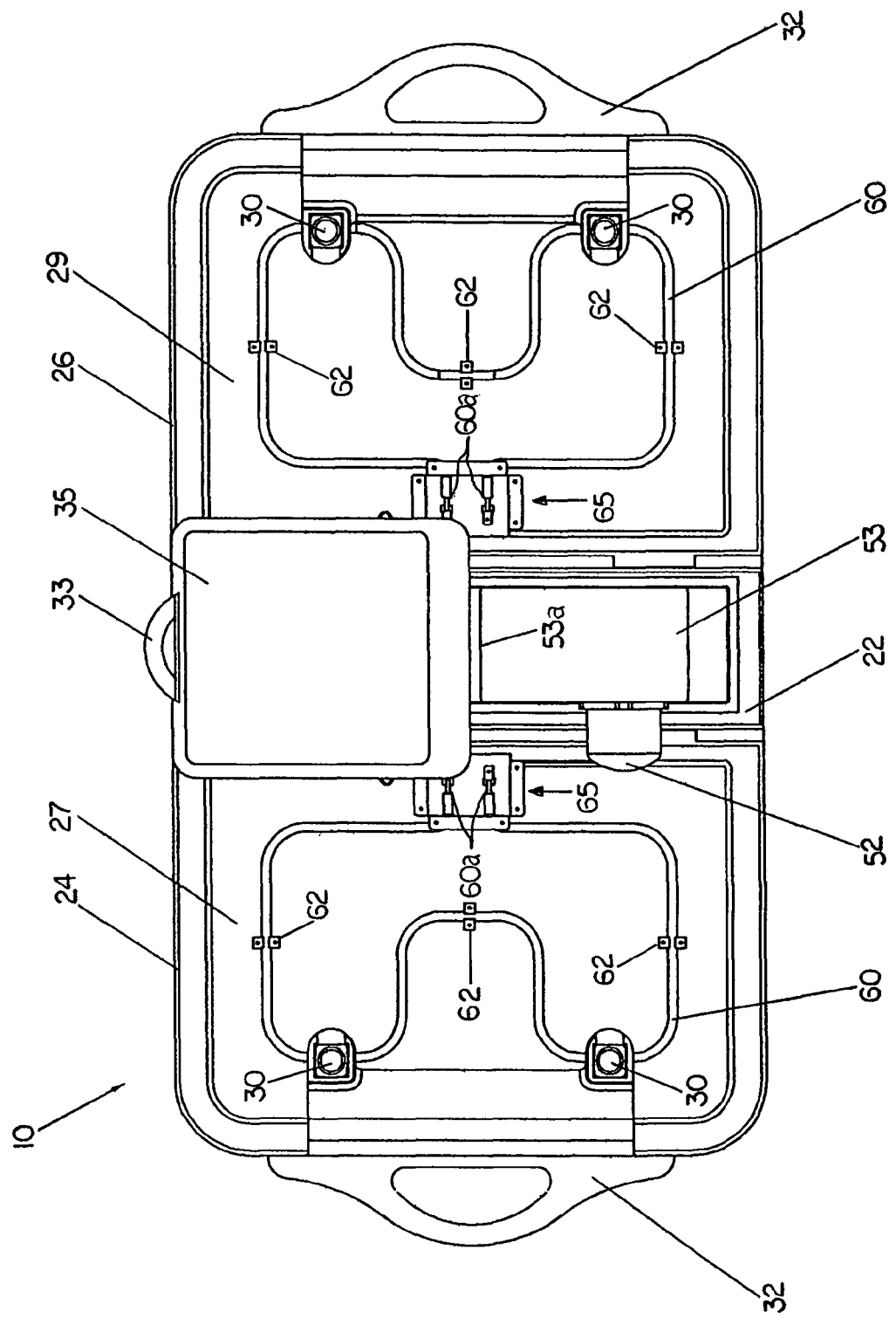
FIG. 6 is a bottom plan view of the present grill in an unfolded position.

The present grill 10 is also provides structures which comprise heating means including, but not limited to, the following structures. Referring to FIG. 6 it can be seen that heating elements 60 are attached to the underside of griddle plate 27 and grill plate 29, which are constructed from a highly heat conductive material such as cast aluminum, cast iron, steel, or other suitable material for efficient heat transfer.

In the embodiment shown in FIG. 6 heating elements 60 are constructed of stainless steel tubing or other suitable tubing wherein a resistance heater wire (not shown) is enclosed. Heating elements 60 are attached in the positions shown in FIG. 6 to plates 27, 29 respectively by retaining clips 62. The terminal ends 60a of heating elements 60 are each received within terminal box, indicated generally at 65, wherein the heating elements are electrically interconnected to their respective temperature controls.

Figure 7:
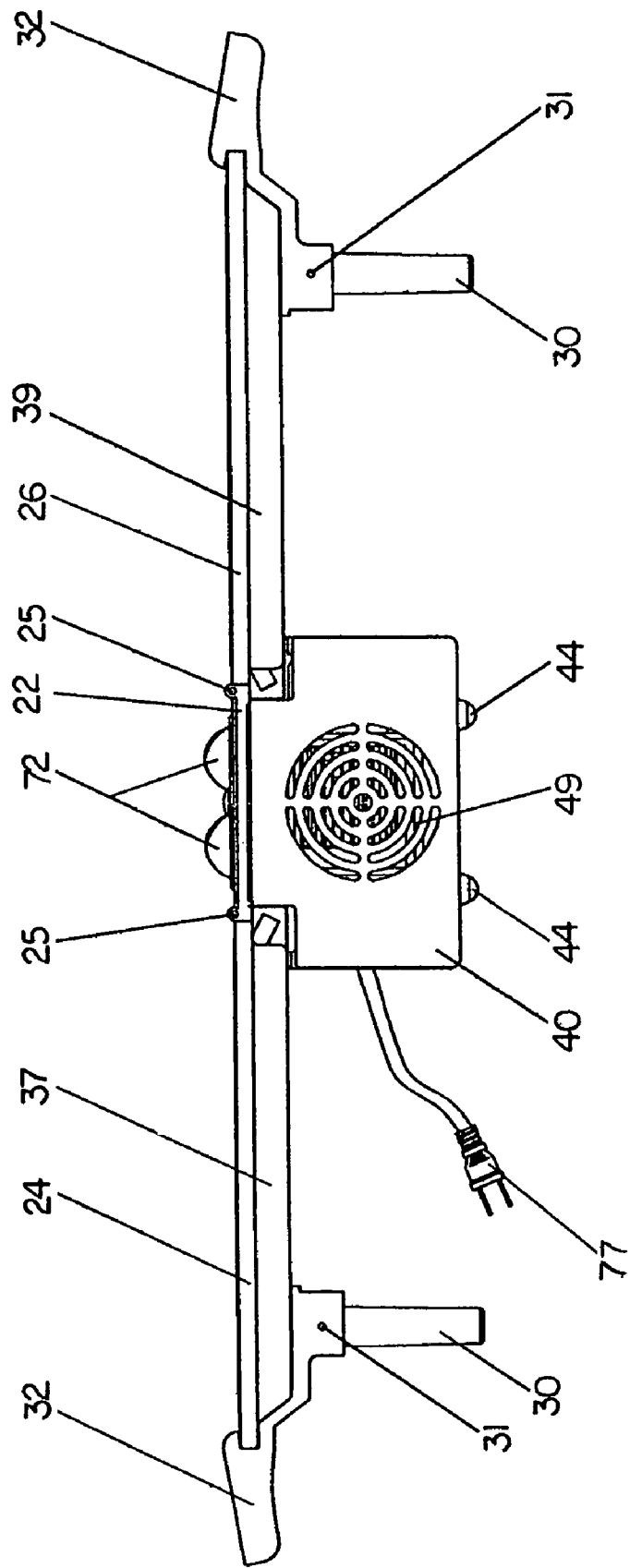
FIG. 7 is a rear elevation of the present grill in an unfolded position.

The present grill 10 also provides structures, which comprise temperature controlling means including, but not limited to, the following structures. Each heating element 60 is electrically connected to its respective temperature controller 70 and, in turn, to a power source 79 (FIG. 8) by wiring via power cord 77 (FIG. 7). Each temperature controller 70 comprises a thermostat, which can be actuated by control knobs 72 independently of each other to selectively energize the heating elements 60.

Figure 8A:
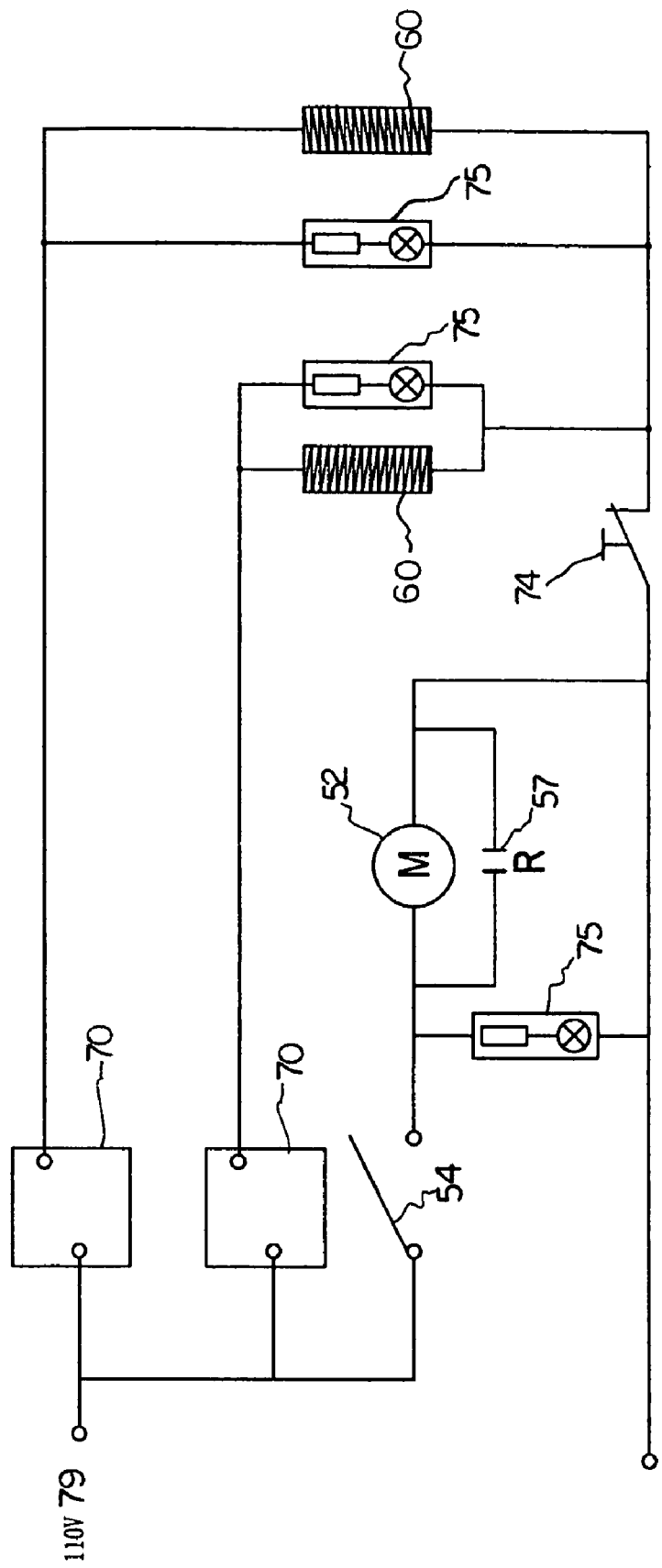
FIG. 8A is an electrical schematic showing the components and circuitry of the present grill.

Referring to FIG. 8A there is shown therein a schematic representation of the electrical components and circuitry of the present grill 10 including the temperature controllers 70, the heating elements 60, fan motor 52 with start capacitor 57, On/Off switch 54, and their associated circuitry. It can be seen that the electrical components include a temperature limiting device 74 which prevents the heating elements 60 from exceeding a predetermined temperature for safety reasons. Indicator lights 75 are electrically connected to fan motor 52 and heating elements 60 being illuminated when the fan motor and heating elements are in operation.

Figure 8B:
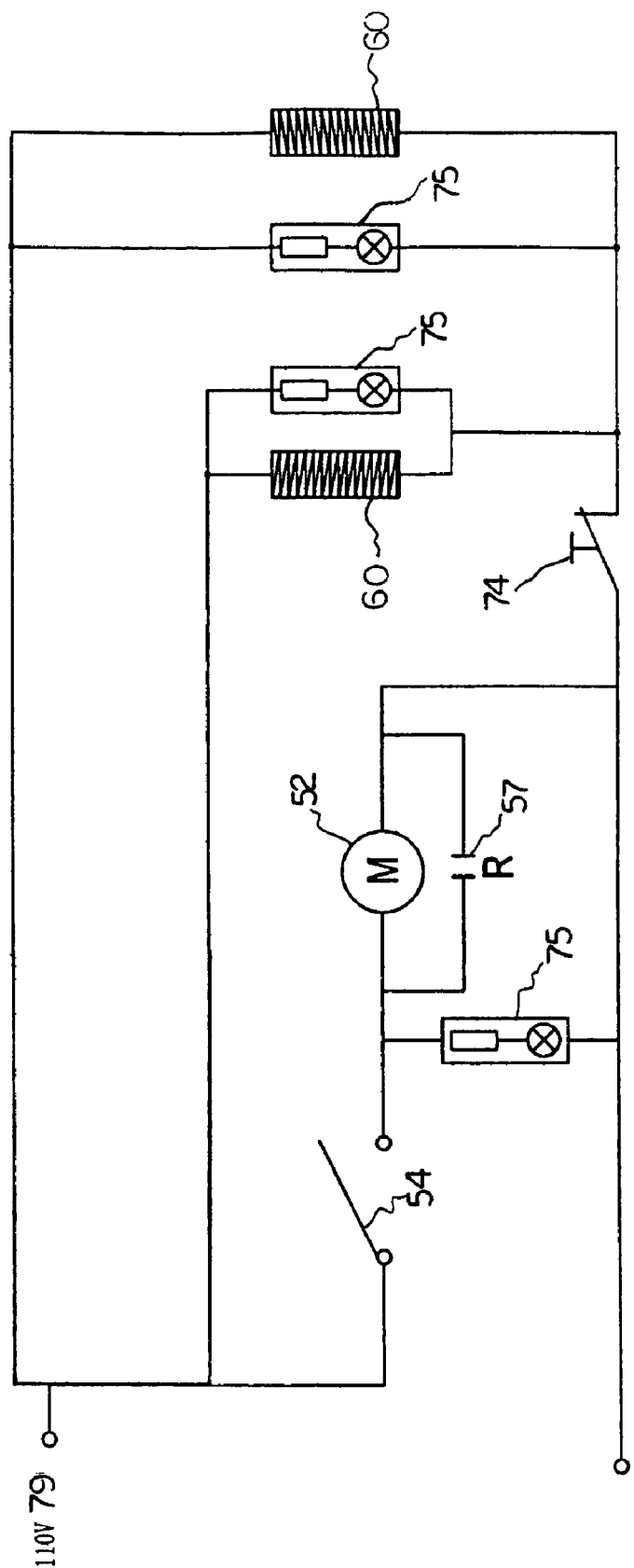
FIG. 8B is an electrical schematic showing the components and circuitry of an alternative construction of the present grill.

In an alternative construction of the present grill 10B shown schematically in FIG. 8B, heating elements 60B are designed with a resistance heater wire, which will produce a precalculated temperature range for cooking food items intended for a particular grill application. In such alternative construction (FIG. 8B) the thermostatic temperature controls 70 can be omitted and operating temperature of heating elements 60B is controlled by temperature limiting device such as fuse 74 or other similar device that is utilized in conjunction with resistance heating elements 60B, which are designed to limit operating temperatures to a predetermined level.

Grill 10 is designed for use with a standard 120 volt, 60 Hz power source. In the embodiment shown heating elements 60 are designed to operate in the range of 1200-1500 watts. Of course, this wattage rating may vary for a given application and capacity of the grills 10.

Figure 9:
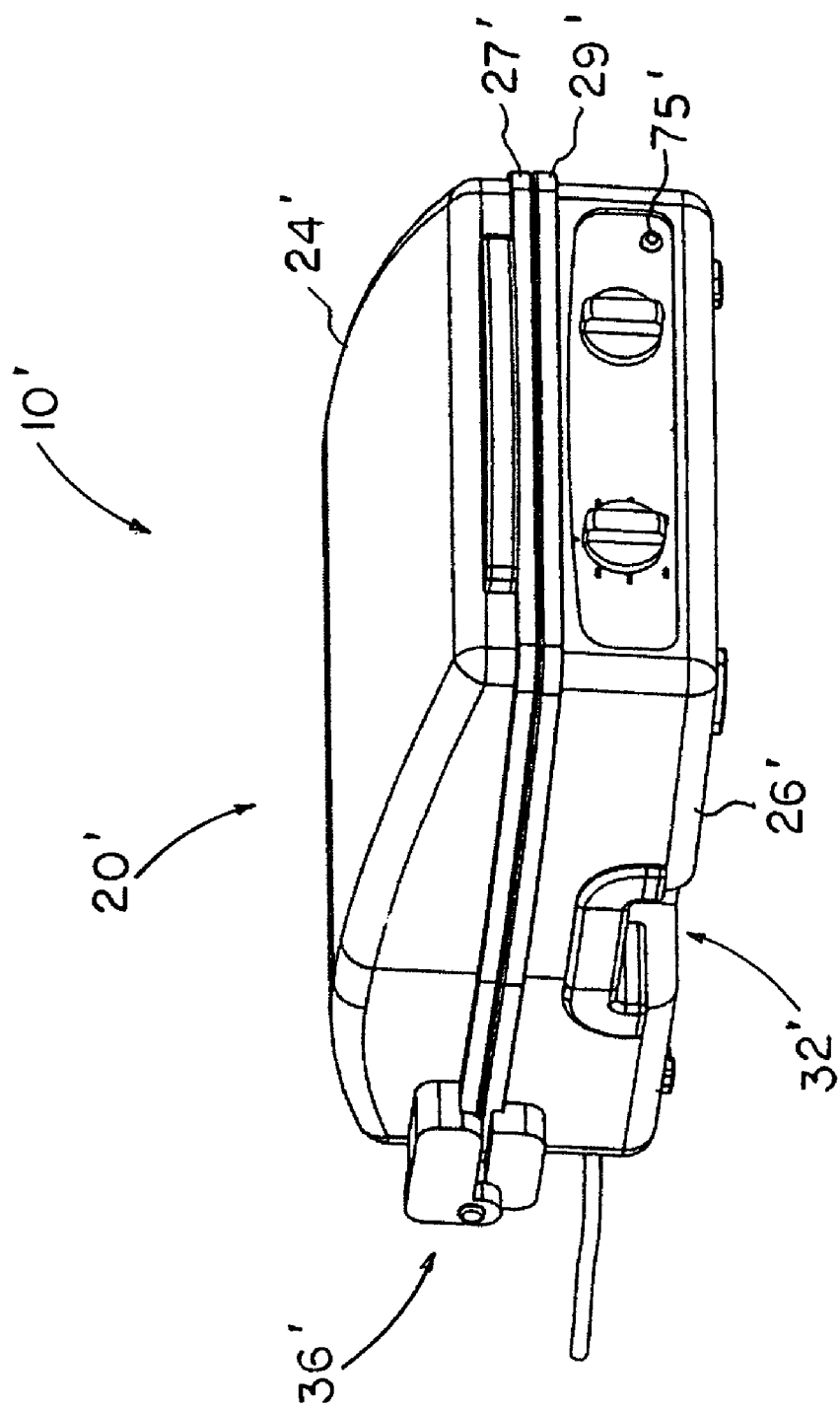
FIG. 9 is a perspective view of another embodiment of the present grill.

Referring now to FIG. 9 there is shown another embodiment of the present portable electric grill, indicated generally at 10'. In this embodiment the present grill 10' includes a grill housing assembly 20' comprised of an upper housing member 24' and a lower housing member 26' wherein grill plates 27', 29' respectively are received and supported. Grill plates include raised peripheral edges 27a', 29a' (FIG. 12) respectively which function to retain grease drippings from meats and other food items prepared thereon. Grill plates 27', 29' are constructed to be removable from housing members 24', 26' for cleaning purposes.

Figure 10A:
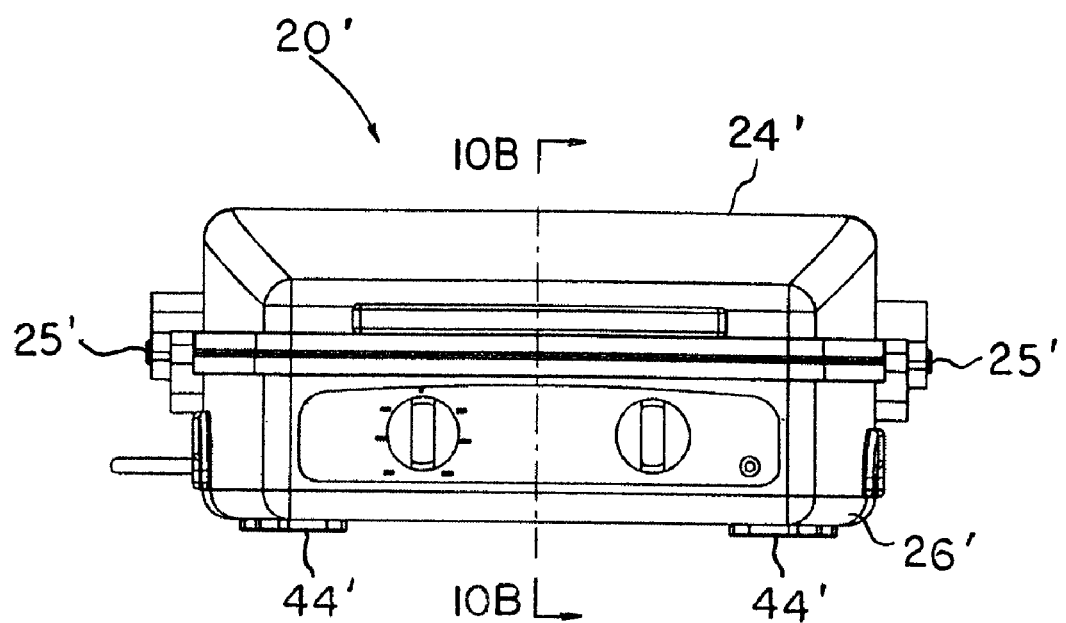
FIG. 10A is a front elevation of the present grill shown in FIG. 9.
Figure 10B:
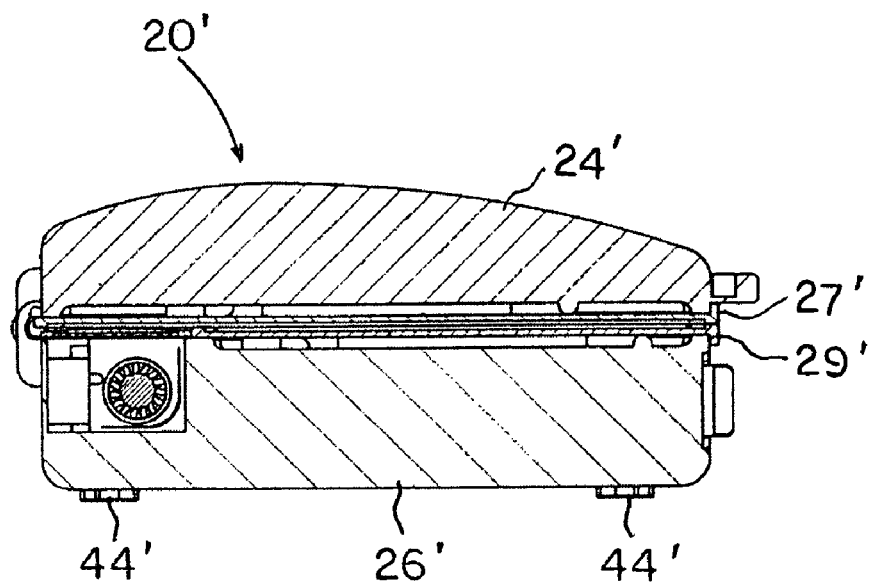
FIG. 10B is a transverse cross-section of the present grill taken along section line 10B-10B of FIG. 10A.

Lower housing member 26' is provided with a pair of opposed handholds 32' formed therein to permit the grill 10' to be conveniently grasped and carried by the user to a desired location. Lower housing member 26' also includes a plurality of fixed feet 44' as shown in FIGS. 10A and 10B, which support the present grill 10' on a countertop or other suitable surface in a level condition.

Housing members 24', 26' are fabricated from sheet steel, aluminum, cast iron, or other suitable material and are provided in different exterior finishes such as powder coating, stainless steel, or plated steel.

Figure 11A:
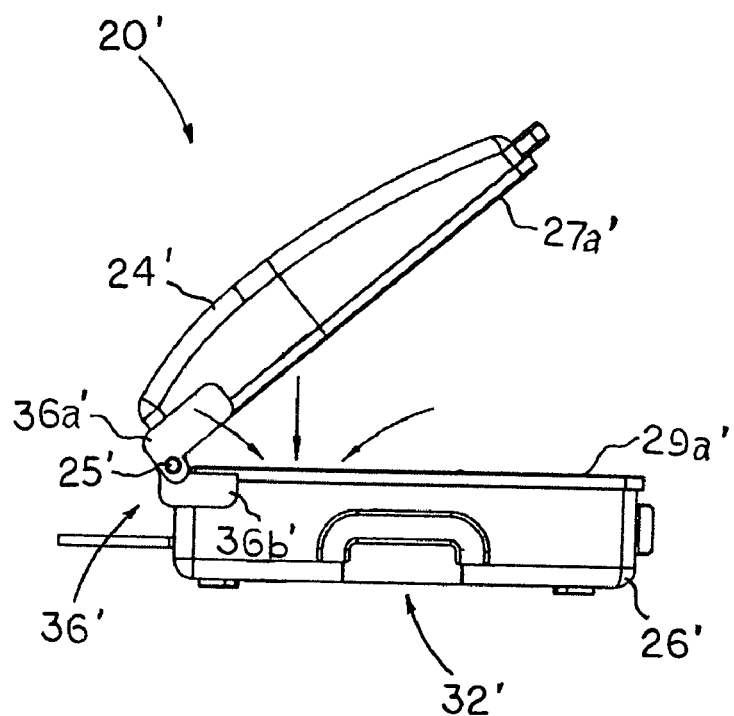
FIG. 11A is a side elevation view of the present grill in a partially closed position for double-sided grilling of food items.
Figure 11B:
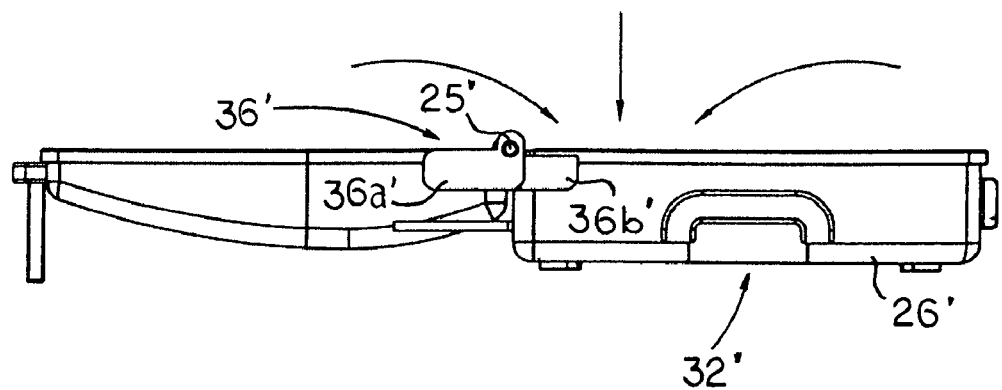
FIG. 11B is a side elevation view of the present grill in an open position for single-sided grilling of food items.

The housing assembly 20' provides structures, which comprise articulating means including, but not limited to, the following structures. As shown in FIGS. 11A and 11B, housing members 24', 26' are pivotally attached by a pair of hinges, indicated generally at 36', including hinge arms 36a' that are mechanically connected to upper housing member 24' as shown in FIGS. 11A and 11B. Hinge pins 25' are installed through hinge arms 36a' and are received in a mating pair of hinge lugs 36b', which are attached to lower housing member 26' as shown. In this configuration the housing members 24', 26' with the grill plates 27', 29' installed are foldable 180 degrees about the hinge pins 25' from a closed position to an open position of the present grill 10' as shown in FIGS. 11A and 11B.

Figure 12:
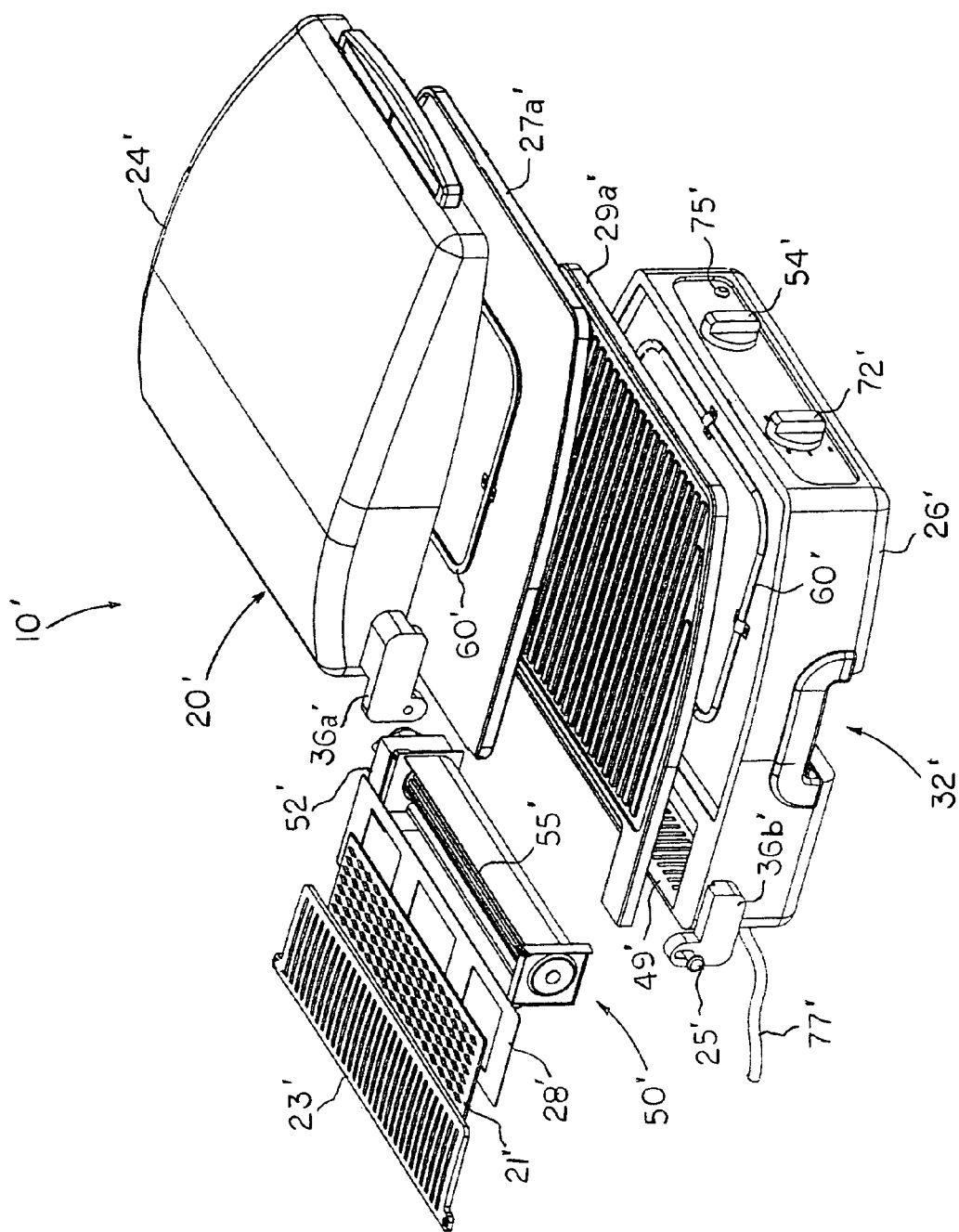
FIG. 12 is an exploded perspective view of the present grill including an integrated exhaust fan assembly disposed therein.

Referring to FIG. 12 there is shown an exploded perspective of the present grill 10' showing the interior components thereof in further detail. In this embodiment lower housing member 26' encloses an exhaust fan assembly, indicated generally at 50', including a cylindrical fan wheel 55' which is integrated into the construction of the lower housing member. The air intake for the fan wheel 55' is through a vent plate 23' such that fan wheel 55' draws smoke and cooking fumes generated during use across the plates 27', 29' and into the fan wheel. Fan wheel 55' propels this flow of filtered air through an exhaust vent 49' (FIG. 12) at the rear of the housing 20' and into the atmosphere. Fan wheel 55' is mechanically coupled to a fan motor 52', which is electrically connected to a standard 110 volt power source 79 via On/Off switch 54' as shown schematically in FIG. 17.

Advantageously, vent plate 23' is disposed in overlying relation to an air filter 21' as shown in FIG. 12. Air filter 21' is retained in this position by a support plate 28' whereon the air filter resides. The media utilized in the air filter 21' is the physical mechanism for controlling smoke and cooking fumes to permit indoor use of the present grill 10'. The media in the air filter 21' ranges from metallic fibers, synthetic fibers, cellulose fibers, and/or multilayer media designed to capture particulate matter of a size range typically encountered in smoke and cooking fumes generated by the present grill 10'.

Grill 10' also provides structures, which comprise heating means including, but not limited to, the following structures. Still referring to FIG. 12 it can be seen that heating elements 60' are installed adjacent to an underside of grill plates 27', 29' which are constructed from a highly heat conductive material such as cast aluminum, cast iron, steel, or other suitable material for efficient heat transfer.

In the embodiment shown in FIG. 12, heating elements 60' are constructed of stainless steel tubing or other suitable tubing wherein a resistance heater wire (not shown) is enclosed. Heating elements 60' are attached beneath plates 27', 29' respectively in the positions shown by suitable fasteners and are electrically interconnected to temperature controls.

The present grill 10' also provides structures, which comprise temperature controlling means including, but not limited to, the following structures. Heating elements 60' are electrically connected to a temperature controller 70' and, in turn, to a power source 79 (FIG. 17) by electrical wiring via power cord 77' (FIG. 12). Temperature controller 70' comprises a thermostatic switch, which can be actuated by control knob 72' to energize the heating elements 60'.

Figure 13:
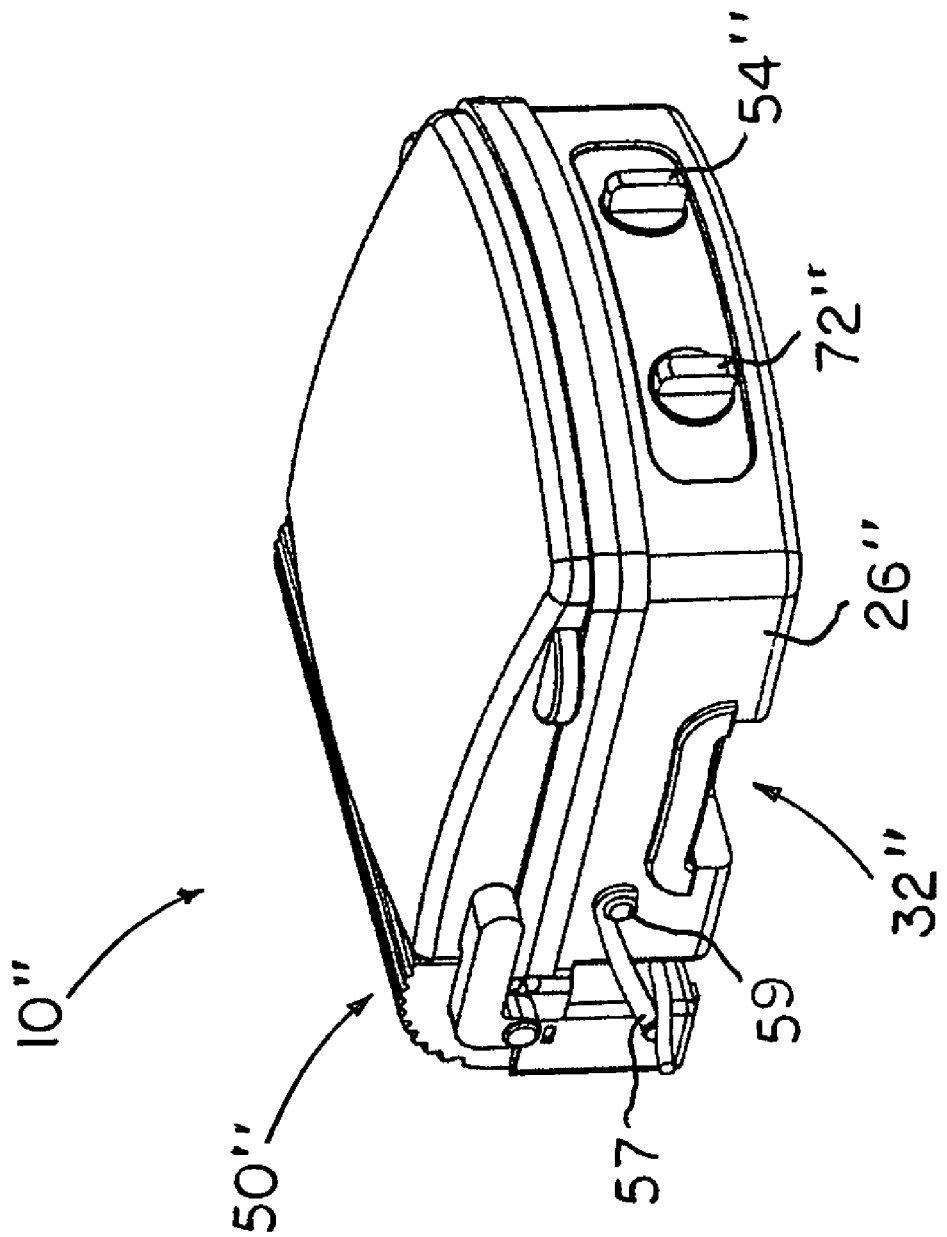
FIG. 13 is a perspective view of another embodiment of the present grill in a closed position.
Figure 14A:
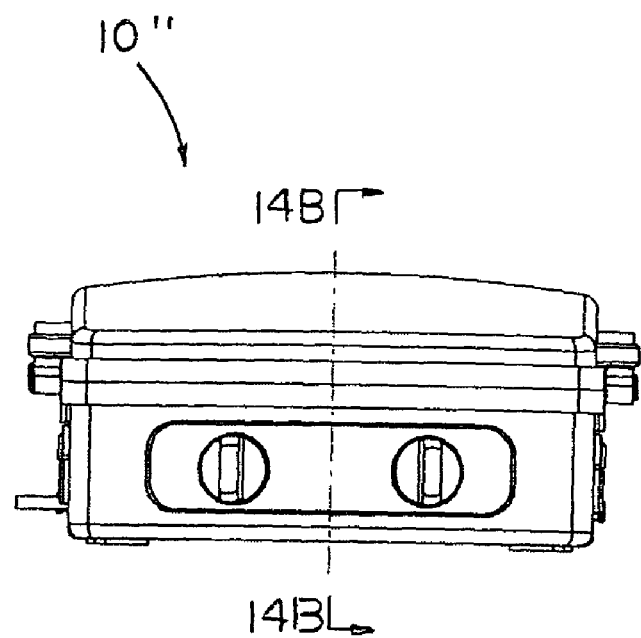
FIG. 14A is a front elevation of the present grill shown in FIG. 13.
Figure 14B:
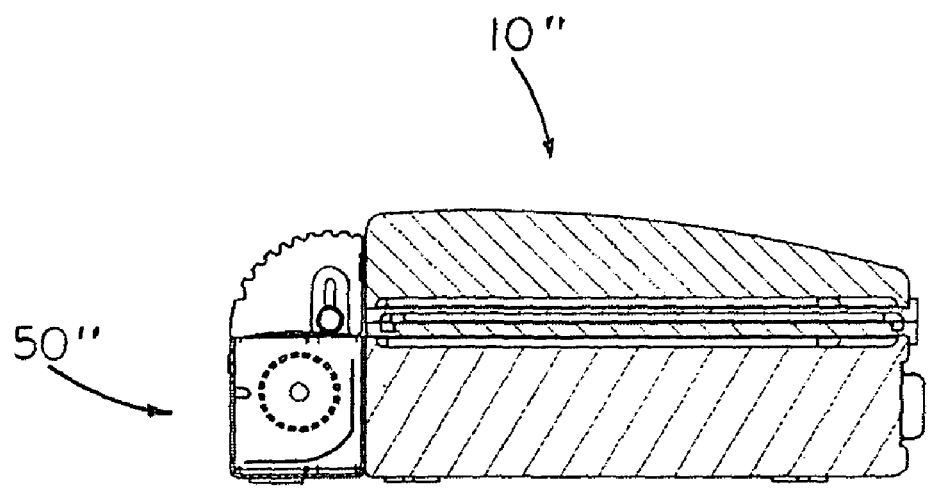
FIG. 14B is a transverse cross-section of the present grill taken along section line 14B-14B of FIG. 14A.
Figure 15:
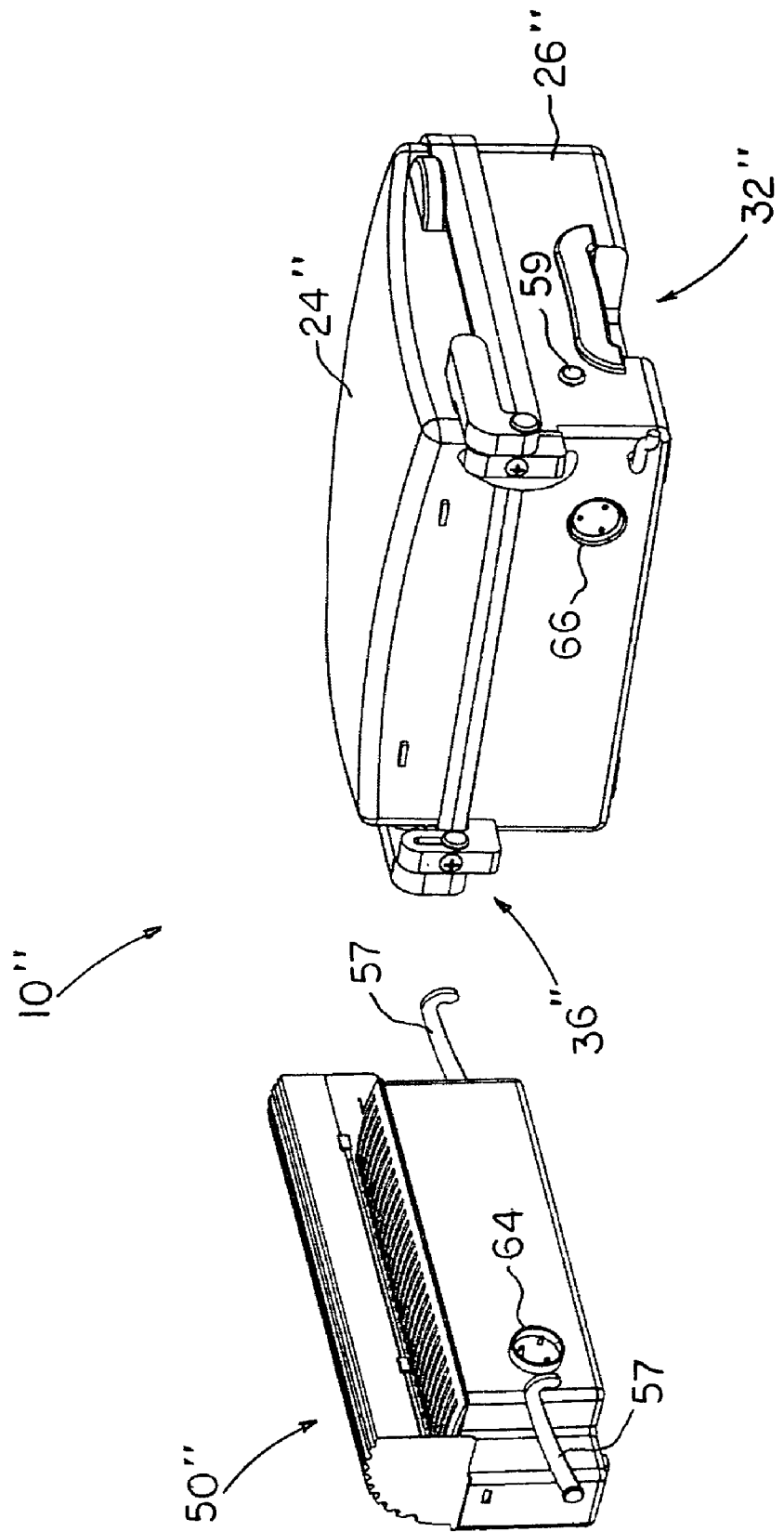
FIG. 15 is a composite perspective view of the present grill illustrating the exhaust fan module separated from the grill housing showing further details thereof.
Figure 16:
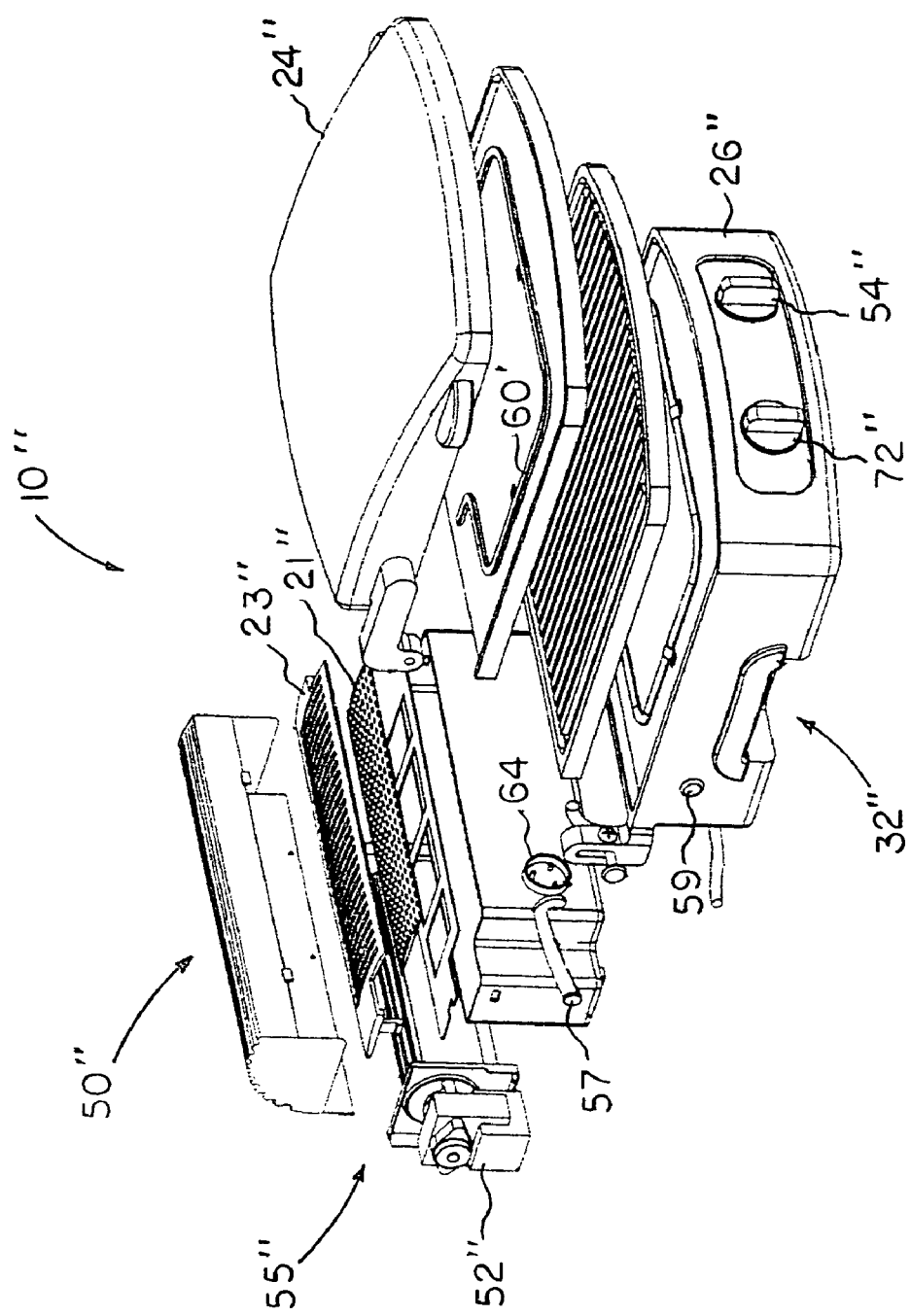
FIG. 16 is an exploded perspective view of the present grill including the exhaust fan module showing further details thereof.

Referring now to FIG. 13 there is shown another embodiment of the present grill, indicated generally at 10". In this embodiment grill 10" includes an exhaust fan module 50" which is detachable from the lower housing member 26" (FIG. 15). Grill 10" provides structures comprising connecting means including, but not limited to, the following structures. As more clearly shown in FIG. 16 fan module 50" includes a pair of hook-shaped latches, indicated generally at 57, which are pivotably mounted on fan module 50" as shown. Latches engage mating posts 59 attached to lower housing member 26" to physically connect fan module 50" to the lower housing member 26" when positioned in alignment as shown in FIG. 13. Fan module 50" also includes an electrical connector 64 (FIG. 16) that is received in a mating electrical receptacle 66 (FIG. 17) located at the rear of lower housing member 26" which, in turn, is electrically connected to a 110 volt power source 79.

Figure 17A:
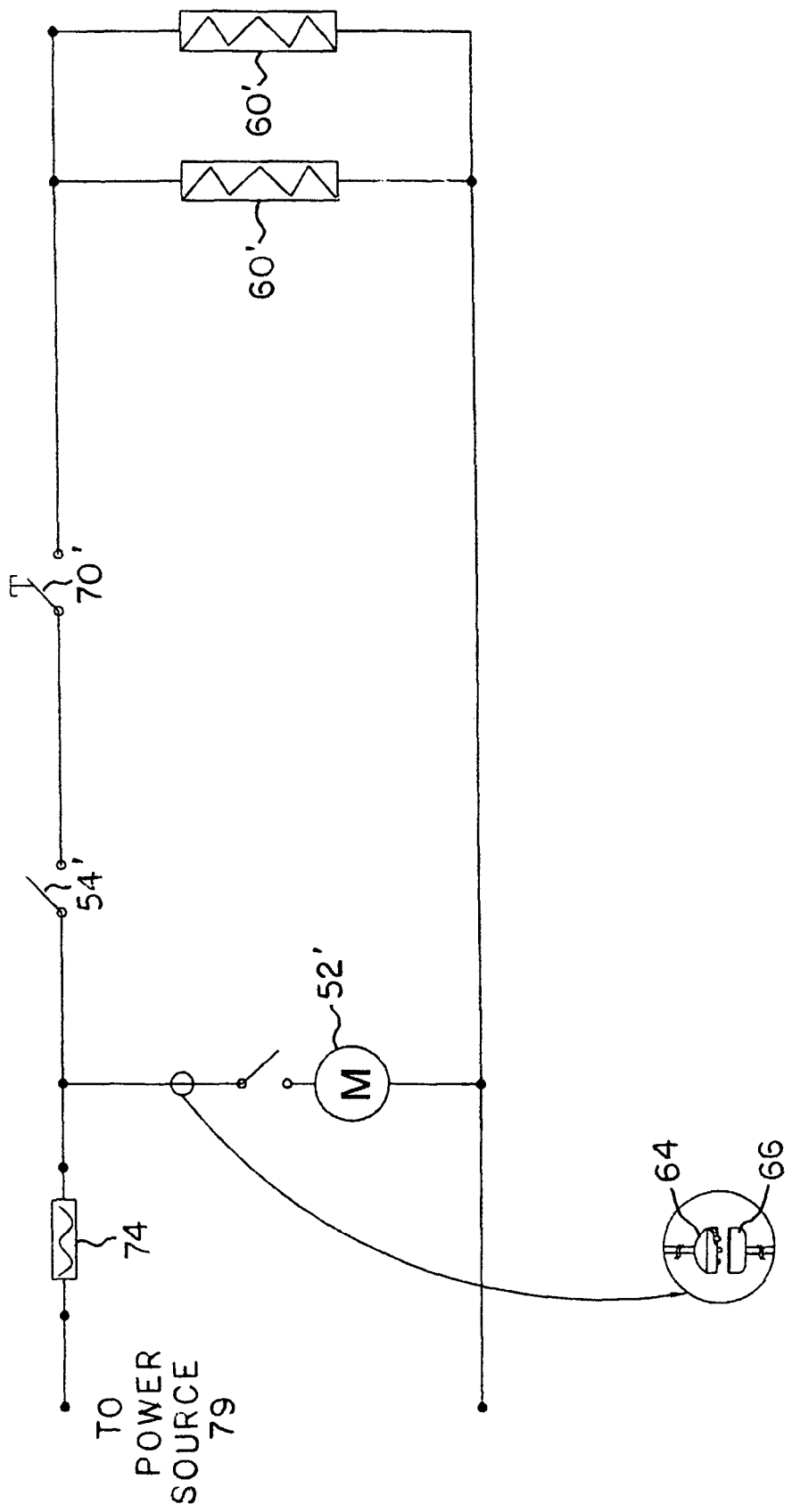
FIG. 17A is an electrical schematic illustrating the components and circuitry of the present grill.

Referring to FIG. 17 there is shown therein a composite schematic representation of the electrical components and circuitry of the present grills 10', 10" including the temperature controller 70', the heating elements 60', fan motor 52', On/Off switch 54', and their associated circuitry. It can be seen that the electrical components also include a temperature limiting device or fuse 74, which prevents the heating elements 60' from exceeding a predetermined temperature for safety reasons. Optionally, a power indicator light 75' (FIG. 12) is electrically connected to fan motor 52' and to heating elements 60' being illuminated when the fan motor and heating elements are in operation.

Figure 17B:
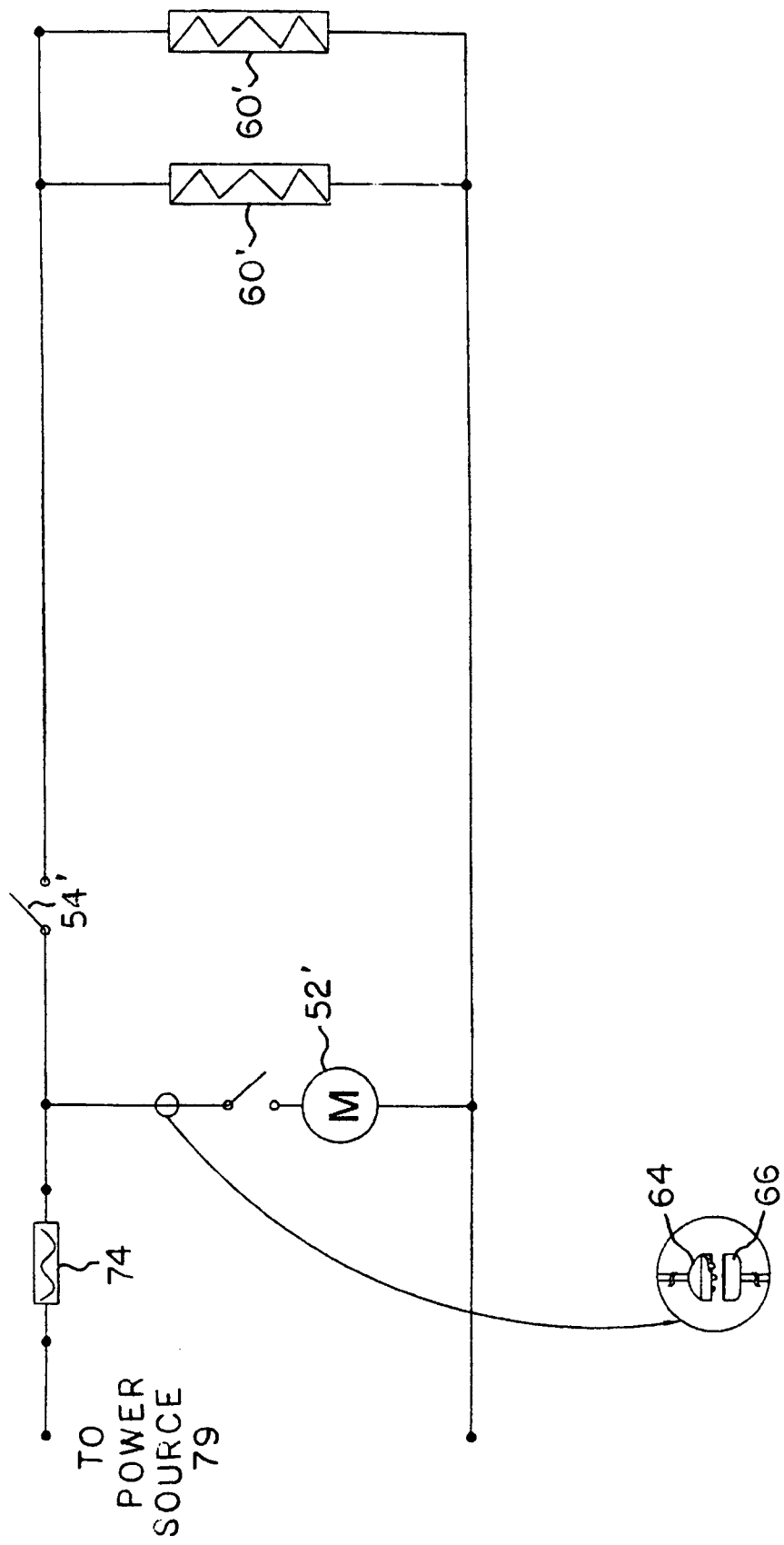
FIG. 17B is an electrical schematic of an alternative embodiment of the present grill illustrating the components and circuitry thereof.

In alternative constructions for each of the present grills 10', 10" shown in composite in FIG. 17B, heating elements 60' are designed with a specific resistance heater wire, which will produce a precalculated temperature range for cooking food items intended for a particular grill application. In such alternative constructions the thermostatic temperature controller 70' is omitted and the operating temperature of heating elements 60' is controlled by a temperature limiting device such as fuse 74 or other similar device that is utilized in conjunction with resistance heating elements 60', which are designed to limit operating temperatures to a predetermined level.

Grills 10' and 10" are designed for use with a standard 120 volt, 60 Hz power source. In the embodiments shown heating elements 60' and 60" are designed to operate in the range of 1200-1500 watts. Of course, this wattage rating may vary for a given application and capacity of the grills 10' and 10".

In operation grills 10' and 10" are disposed in the desired cooking positions shown in FIGS. 11A and 11B and the On/Off switch 54' is turned "On" to pass the flow of electric current to the temperature controller 70' and the fan motor 52' illuminating indicator light 75'. Thereafter, control knob 72' is used to regulate the flow of electric current from the power source 79 via temperature controller 70' to the heating elements 60'. Advantageously the present grills 10' and 10" can be operated in the closed position for double-sided grilling of food items such as hamburgers or, alternatively, in an open position for single-sided grilling (FIGS. 11A and 11B).

After use is complete grills 10', 10" are folded to their respective closed positions permitting convenient handling and storage. Grill plates 27', 29' are detachable for cleaning and storage.

Although not specifically illustrated in the drawings, it should be understood that additional equipment and structural components will be provided as necessary and that all of the components described above are arranged and supported in an appropriate fashion to form a complete and operative foldable electric grill incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

The invention claimed is:

1. A portable electric grill comprising:
a foldable housing assembly including an intake vent and an exhaust vent, said housing assembly further including an upper housing member and a lower housing member interconnected by articulating means enabling said housing assembly to be manually shifted from an open position to a closed position of said grill;
a pair of grilling plates disposed within said upper housing member and said lower housing member;
a detachable exhaust fan module including connecting means for attachment of said exhaust fan module to said housing assembly, wherein said connecting means includes a pair of mechanical latches that are pivotably mounted on said fan module in mating engagement with a pair of latch posts attached to said lower housing member; and
heating means disposed in proximity to each of said grilling plates.

2. The portable electric grill of claim 1 wherein said exhaust fan module is disposed in fluid communication with said intake vent and said exhaust vent enabling said exhaust fan module to draw cooking gases into said intake vent to facilitate indoor use thereof.

3. The portable electric grill of claim 1 wherein said connecting means further includes an electrical connector that is received in a mating electrical receptacle located on said lower housing member.

4. The portable electric grill of claim 1 wherein said intake vent includes an air filter disposed therein.

5. The portable electric grill of claim 1 wherein said grilling plates are detachable from said upper housing member and said lower housing members for cleaning purposes.

6. The portable electric grill of claim 1 including temperature controlling means electrically interconnected with said heating means enabling selective operation thereof in said open position and said closed position.

7. The portable electric grill of claim 6 wherein said temperature controlling means includes a thermostatic switch electrically connected to said heating means.

8. An improved electric grill having a housing assembly including an intake vent and an exhaust vent, said housing assembly further including an upper housing member and a lower housing member interconnected by articulating means enabling said housing assembly to be manually shifted from an open position to a closed position of said grill, at least one grill plate, at least one heating element disposed in proximity to said at least one grill plate, wherein the improvement comprises:
a detachable exhaust fan module including connecting means for attachment of said exhaust fan module to said housing assembly, wherein said connecting means includes a pair of mechanical latches mounted on said fan module in mating engagement with a pair of latch posts attached to said lower housing member, said exhaust fan module being disposed in fluid communication with said intake vent and said exhaust vent enabling said exhaust fan module to draw cooking gases into said intake vent to enable indoor use thereof.

9. An improved electric grill of claim 8 wherein said connecting means further includes an electrical connector that is received in a mating electrical receptacle located on said lower housing member.

10. An improved electric grill of claim 8 further including an air filter disposed within said intake vent.

11. An improved electric grill of claim 8 including temperature controlling means electrically interconnected with said at least one heating element enabling selective operation thereof in said open position and said closed position.

12. An improved electric grill of claim 11 wherein said temperature controlling means includes a thermostatic control device electrically connected to said at least one heating element.

* * * * *